UNITED STATES PATENT OFFICE.

ACHILLES BLAKER, OF SHEDD, OREGON, ASSIGNOR OF ONE-HALF TO A. WHEELER, OF SAME PLACE.

PROCESS OF TREATING POMACE FOR KEEPING THE EXTRACT CLEAR.

SPECIFICATION forming part of Letters Patent No. 319,549, dated June 9, 1885.

Application filed March 16, 1885. (No specimens.)

*To all whom it may concern:*

Be it known that I, ACHILLES BLAKER, of Shedd, Linn county, State of Oregon, have invented an Improvement in Process of Treating Pomace for Keeping the Extract Clear; and I hereby declare the following to be a full, clear, and exact description of the same.

My invention relates to a new and useful process of or improvement in the treatment of fruit or pomace from which a liquid extract is to be pressed; and my invention consists in subjecting the fruit or pomace before or during or after the process of grinding and before it is pressed to the action of suitable gases or vapors, such as sulphur-fumes, as I shall hereinafter fully explain.

The particular application of my invention is to the treatment of apple-pomace; and its object is to keep the cider, which is subsequently pressed, from turning the red color which it usually has, and to keep it as clear as when in the fruit.

In carrying my invention into effect the prime necessity is that the treatment with the sulphur-fumes or other gases shall take place before the pomace is subjected to the operation of pressing, and therefore I grind or otherwise cut the fruit within a chamber into which the sulphur-fumes or other gases are conducted or in which they are generated, or after the pomace is made I drop it down through the sulphur-fumes or other gases on its way to the pressing device. Upon pressing the pomace it will be found that the liquid extracted is clear, instead of being of the usual dirty-red color.

I am aware that it is not new to treat the liquid after it has been extracted with sulphur-fumes for antiseptic purposes; but this process differs materially from mine both in its nature and object. My treatment takes place before any pressing operation, and is for the purpose of obtaining a clear extract, while in the process referred to the treatment takes place in the extract itself and is for an antiseptic purpose. The liquid which is extracted after my process has been performed is not only clear but makes a much clearer jelly, and in my opinion the treatment as I have described induces a more abundant yield of liquid.

Having thus described my invention, what I claim as new, and desire to secure by Letters Patent, is—

1. The improvement in treating pomace to obtain a clear liquid extract, consisting in grinding the fruit or otherwise forming the pomace in or introducing it into the presence of sulphur-fumes or other suitable vapors or gases before it is subjected to the pressing operation, substantially as herein described.

2. The improvement in treating pomace, consisting in forming the pomace in or introducing it into the presence of sulphur-fumes before it is subjected to the pressing operation, whereby the liquid extracted is obtained clear, substantially as herein described.

3. The improvement in treating apple-pomace to obtain a clear cider, consisting in grinding the apples or otherwise forming the pomace in or introducing it into the presence of sulphur-fumes before it is subjected to the pressing operation, substantially as herein described.

4. The improvement in obtaining a clear liquid extract from pomace, consisting in grinding the fruit or otherwise forming the pomace in or introducing it into the presence of sulphur-fumes, and in subsequently pressing the pomace thus treated to obtain a clear extract, substantially as herein described.

In witness whereof I have hereunto set my hand.

ACHILLES BLAKER.

Witnesses:
   A. WHEELER,
   GEO. E. CHAMBERLAIN.